Aug. 2, 1932.   J. H. DE IONGH   1,869,740
WEIGHING APPARATUS

Filed April 26, 1930

Inventor:
Johan H. de Jongh,
Chas. M. Nissen,
BY
ATT'y.

Patented Aug. 2, 1932

1,869,740

UNITED STATES PATENT OFFICE

JOHAN HENDRIK DE IONGH, OF WASSENAAR, NETHERLANDS, ASSIGNOR TO NAAM-LOOZE VENNOOTSCHAP MAATSCHAPPIJ TOT VERVAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

WEIGHING APPARATUS

Application filed April 26, 1930, Serial No. 447,454, and in Great Britain May 17, 1929.

This invention relates to weighing apparatus and more particularly to apparatus of the type having automatic load counterbalancing devices and provided with one or more supplementary weights for increasing the normal weighing capacity of the weighing apparatus.

One object of the present invention is to improve the arrangement of the supplementary weights so that the same will be more compact and also improve the means for guiding that part of the weighing mechanism which is connected to the automatic load counterbalancing devices.

Another object of this invention is to provide supplementary weights which act directly on the automatic load counterbalancing devices. In carrying out this object I provide a suitable mechanism for controlling the position of the weights.

In weighing apparatus of this type there is an actuating rod for actuating the load counterbalancing devices and my invention relates to a means for adding the supplemental weights directly to this actuating rod either above or below the load counterbalancing devices.

The load counterbalancing devices in the preferred form of my invention comprises drums or segments guiding an actuating rod therefor, the latter having weights which are directly supported or suspended from said rod.

Another object of this invention is to so arrange the actuating rod for actuating the load counterbalancing devices that the same rests directly on the weigh-beam or steelyard. The rod may be supported by one of the knife edges on the weigh-beam in such a manner that it can move laterally relatively to the knife edge. For this purpose I provide a member interposed between the actuating rod and the weigh-beam or steelyard which has one or more curved rolling surfaces thereon and preferably mounted on the weigh-beam or steelyard. As the end of the weigh-beam or steelyard moves in an arcuate path, motion is imparted in a rectilinear direction to the actuating rod.

Another object of this invention is to provide an improved means for guiding the actuating rod.

In the drawing—

Figure 1:
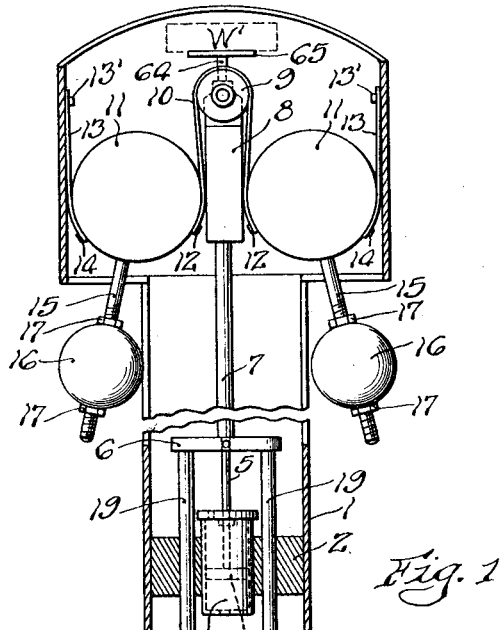
Fig. 1 represents a vertical cross-section taken through a device embodying my invention.
Figure 3:
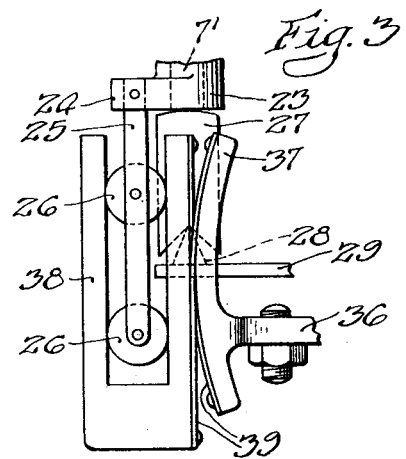
Fig. 3 is an enlarged detail view of the means for connecting the end of the weigh-beam or steelyard to the actuating rod.

In the drawing the reference numeral 1 indicates the casing for my weighing apparatus. This casing has a cross-member 2 which supports the dash-pot 3, the dash-pot 3 having a piston 4 operating therein and this piston is connected by means of a piston rod 5 to a cross-piece 6 attached to the load counterbalancing actuating rod 7. As the actuating rod 7 moves up and down, the piston 4 in the dash-pot acts to check the movements of the actuating rod 7.

The actuating rod 7 carries a member 8 at its upper end, this member 8 carrying a rotatable pulley 9 over which is trained a flexible member 10. The flexible member 10 is attached at its opposite ends to freely rotatable elements 11 at 12. The flexible elements 13 secured at 13' to the casing 1 are also attached to the rotatable members 11 at 14. The flexible elements 10 and 13 are preferably formed of steel and support the rotatable members 11 for purposes which will presently appear. Each rotatable member 11 has a rod 15 extending therefrom, and these rods support the counterbalancing weights 16 which are held in adjusted position on the rods 15 by the lock nuts 17.

The actuating rod 7 which is secured to the cross-member 6 is operatively connected to the cross-member 18 on the lower part 7' of the actuating rod 7 by means of the rods 19 which extend through suitable openings in the cross-member 2 and have their opposite ends secured in the cross-members 6 and 18. The lower part of the actuating rod 7' carries a plate 20 upon which the supplementary weights 21 and 22 are adapted to rest when it is desired to increase the weighing capacity of the weighing apparatus.

In order to guide the lower part 7' of the actuating rod, I secure thereto a member 23 having an offset portion 24 carrying a downwardly extending bracket 25 for supporting the rollers 26. The actuating rod itself rests on a rockable member 27 having an upper curved surface which engages the actuating rod and a lower bearing surface which engages the knife edge 28 on the end of the spring 29 secured at 30 to the weigh-beam or steelyard 31. The rockable member 27 is preferably pivoted to rock about an axis in alinement with the knife edge and is preferably pivoted on the weigh-beam or steelyard so as to move therewith. The weigh-beam or steelyard has a knife edge 32 for pivotally supporting the weigh-beam on the support 33. The weigh-beam also has a scale pan 34 pivoted therefrom at 35 and this scale pan is adapted to carry the load W which is to be weighed.

The weigh-beam 31 is provided with an extension 36 having an arcuate portion 37 thereon and adjacent this arcuate portion is a substantially U-shaped member 38 between the opposite legs of which the antifriction rollers 26 are arranged. Flexible strips 39 secured to the U-shaped member 38 and to the arcuate portion 37 of the weigh-beam hold the arcuate portion against movement away from the U-shaped member while permitting angular movement of the weigh-beam about the knife edge 32. The radius of curvature of the outer surface of the arcuate portion 37 has its center at the knife edge 32 so that while the weigh-beam rocks about its pivot, the member 38 will always be maintained at the same horizontal distance away from the knife edge and the member 38 will move in a perpendicular path. Since the member 38 is always guided in a perpendicular path, the actuating rod 7' will also be guided in a corresponding path due to the fact that the rollers 26 maintain the lower end of the actuating rod 7' in a fixed horizontal position relative to the member 38.

By the arrangement just described it will be seen that while the actuating rod rests freely upon the end of the weigh-beam the lower end thereof is prevented from horizontal movement by means which moves with the weigh-beam and the actuating rod. It is therefore unnecessary to provide any fixed bearing for the lower end 7' of the actuating rod. Furthermore, the upper part of the actuating rod is held in predetermined relation between the rotating members 11 and is guided thereby.

A tare beam 40 pivoted to the casing at 45 is connected by means of a link 46 to the lower portion 7' of the actuating rod. A movable poise 42 is adjustably mounted on the tare arm 40 for the purpose of regulating the position of the actuating rod.

With the mechanism so far described it will be seen that as the load W rotates the beam 31 in a clockwise direction, the member 38 will move vertically as will also the rockable member 27. The rockable member 27 being in engagement with the actuating rod causes the actuating rod to move upward and this in turn moves the member 8 in the same direction. As the member 8 moves upward it carries with it the flexible strip 10 and this movement of the flexible strip 10 lifts the sides of the rotatable members 11 which are nearest to the actuating rod or to the member 8, thus causing these members 11 to rotate in a direction to bring the weights 16 towards the actuating rod 7. This movement of the weights 16 increases the fractions of these weights which are supported by the flexible strip 10 and decreases the fractions of these weights supported by the flexible strips 13 due to the shifting of the center of gravity of these weights. Since more load is exerted on the flexible strip 10 it will be seen that the resistance to upward movement of the actuating rod is increased.

The movements of the member 8 or the actuating rod 7 may be registered by means of any suitable means such as a pointer which traverses a dial which is graduated to indicate the weight of the load placed on the scale pan 34. Such a means is common in the art to which this invention pertains and no illustration of this means is thought to be necessary.

In order to increase the normal weighing capacity of this weighing apparatus additional weights are deposited on the plate 10 as previously described and to facilitate the placing of these weights selectively on the plate 10 I provide a cage 43 provided with openings 44 on the opposite sides thereof, these openings being shaped so as to provide bearing surfaces 47 for the weight 22 and bearing surfaces 48 for the weight 21, the weights being provided with pins 49 and 50 respectively for engaging the bearing portions 47 and 48 respectively. A guide bracket 51 secured by screws 52 or the like to the casing 1 is adapted to be engaged by guide rollers 53 secured to the cage 43. In this manner the cage is guided vertically in a path parallel to the guide rod. The cage is provided with an opening in the cross-member 54 thereof to permit the free passage of the rod 7' therethrough.

Figure 2:
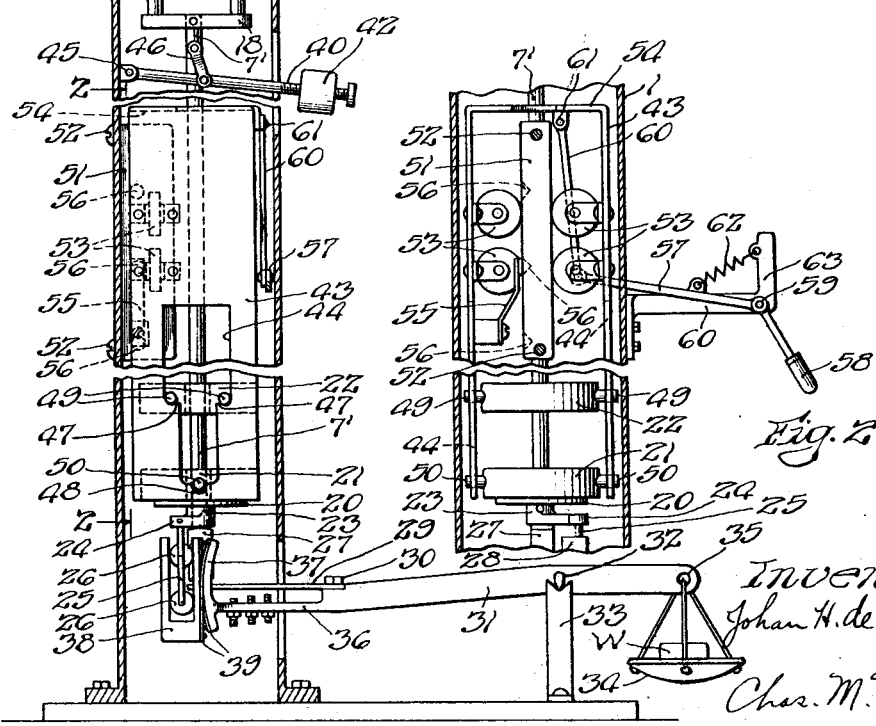
Fig. 2 is a section taken substantially along the line 2—2 of Fig. 1.

In order to hold the cage in various vertical positions I secure thereto a spring detent 55 adapted to engage the notches 56 provided in the guide bracket 51. A bell crank 57 having a handle 58 on one end thereof is pivoted at 59 to a bracket 60 secured to the casing 1 and the other arm of this bell crank is pivotally connected to a link 60 which in turn is pivoted at 61 to the cross-member 54 of the cage 43. A spring 62 operatively connected to an extension 63 on the bracket 60 and to the bell crank 57 is adapted to rotate the bell crank in a clockwise direction as viewed in Fig. 2 and is intended to wholly or partially balance the weight of the cage 43. If the spring 62 properly balances the cage 43, it will be seen that the detent 55 can readily prevent any undesired movement in a vertical directon of the cage 43 without having to exert a great amount of frictional force on the guide bracket 51. By this means therefore it will be seen that the cage may be adjusted to any of its desired positions.

With the parts in the positions shown it will be seen that the weight 21 is resting on the plate 20 and that the weight 22 is supported by the bearing 47 on the cage 43. In order to bring the weight 22 on top of the weight 21 it is only necessary to rotate the bell crank 57 in Fig. 2 in a counter-clockwise direction so as to lower the cage. On the other hand if it is desired to hold the weight 21 as well as the weight 22 out of operative position, it is only necessary to rotate the bell crank 57 in a clockwise direction to lift the weight 22 off the plate 20.

Instead of resting the weights on the plate 20, I may provide the member 8 with an upwardly extending support 64 carrying a weight platform 65 upon which the weight or weights W' may be placed, either by hand or by any suitable mechanical means. The arrangement of the various parts of the weighing mechanism shown in the accompanying drawing greatly reduces the resistance to the vertical movement of the actuating rod and thereby increases the accuracy of the weighing mechanism. By decreasing the resistance offered to the movement of the actuating rod I am enabled to increase the sensitivity of the apparatus and thereby increase the accuracy thereof.

Obviously those skilled in the art to which this invention pertains may make various changes in the arrangement of parts which I have illustrated in the accompanying drawing, and therefore I do not wish to limit the scope of my invention except in the manner set forth in the accompanying claims.

Having thus fully described an embodiment of my invention what I desire to secure by Letters Patent of the United States is:

1. Weighing apparatus comprising load counterbalancing devices, an actuating rod having a portion thereof extending above said load counterbalancing devices, and a supplementary weight platform arranged on this latter portion.

2. In a weighing apparatus, the combination of a weigh-beam, of a counterbalancing device comprising a drum, an actuating member guided by said drum and operatively connected to said weigh-beam, and means on said actuating member for supporting an additional weight.

3. Weighing apparatus comprising a weigh-beam, a load counterbalancing device, and an actuating rod for said load counterbalancing device, said actuating rod resting on the end of said weigh-beam connected thereto by means permitting lateral movement of said rod relatively thereto as the beam moves about its pivot.

4. Weighing apparatus comprising a weigh-beam, a load counterbalancing device, an actuating rod operatively connected to said load counterbalancing device, and antifriction means for guiding said rod in a predetermined path independently of its operative connection to said weigh-beam.

5. A device as claimed in claim 4 in which the antifriction means comprises a plurality of rollers attached to said guide rod and operating on guiding surfaces arranged parallel to said guide rod.

6. In a weighing apparatus the combination with a weigh-beam, a load counterbalancing device, an actuating rod operatively connecting said weigh-beam and said load counterbalancing device, and guiding means for the end of the guide rod adjacent said weigh-beam, said guiding means being carried by the weigh-beam.

7. In a weighing apparatus, the combination with a weigh-beam, a load counterbalancing device, an actuating rod operatively connecting said weigh-beam and said load counterbalancing device, and guiding means for the end of the guide rod adjacent said weigh-beam, said guiding means being arranged by the weigh-beam and comprising a member having a guiding surface parallel to said guide rod for guiding said guide rod and antifriction means arranged between said guide rod and said guiding surface.

8. A weighing apparatus comprising a weigh-beam, load counterbalancing means, an actuating rod interposed between said weigh-beam and said load counter-balancing means, and a cage for selectively depositing additional weights on said actuating rod to regulate the position of said load counterbalancing means.

9. In a slicing machine the combination with a weigh-beam, of load counterbalancing means, a rod operatively connected to said load counterbalancing means and to said weigh-beam, a member for supporting a plurality of weights and for selectively depositing said weights on means provided on said rod so as to increase the weighing capacity of the weighing apparatus, and means for holding said member in any one of a selected number of positions.

10. A device as claimed in claim 9 in which means is provided for substantially counterbalancing the weight of the member which carries the supplemental weights.

11. In a weighing apparatus the combination with a weigh-beam, of a load counterbalancing means, and an actuating rod operatively connected to said weigh-beam and to said load counterbalancing means, said actuating rod being connected to and guided by said load counterbalancing means and said weigh-beam.

12. In a weighing apparatus the combination with an actuating rod, movable weights actuated by said rod, a weigh-beam, and operative connections between said weigh-beam and said actuating rod comprising an arcuate portion on said weigh-beam, a member constrained to move with said arcuate portion but having an angular movement with respect thereto, antifriction means carried by said actuating rod and adapted to engage bearing surfaces on said member to maintain said member in predetermined relation to said actuating rod.

13. A device as claimed in claim 12 in which the arcuate portion and said member are constrained to move with each other by flexible bands connecting to each of said members.

14. In a weighing apparatus, the combination with a substantially horizontal weigh-beam, a vertically extending actuating rod, counterbalancing means for resisting movement of said actuating rod when said weigh-beam is moved in one direction, and operative connections between the end of said weigh-beam and said actuating rod comprising an arcuate portion on said weigh-beam upon which the end of said actuating rod rests, anti-friction rollers carried by the end of said actuating rod, a member having guiding surfaces on which said anti-friction means are guided for rectilinear movement, a second arcuate portion on said weigh-beam, and flexible connections between said members to hold said member having said guiding surfaces against said last mentioned arcuate surface while permitting rocking movement of said member relative to said last mentioned arcuate portion.

15. In a weighing apparatus, the combination with a weigh beam and means for increasing the weighing capacity of said weigh beam comprising a weight platform, a cage having stepped bearing surfaces thereon, weights having lugs adapted to engage different ones of said bearing surfaces, anti-friction means for guiding said cage, means for moving said cage to selectively move one or more of said weights into engagement with said platform, said weights being moved sufficiently so that the weights are not supported by said cage while on said weight platform, and means for holding said cage in any one of a number of selected positions.

16. A weighing apparatus comprising a weigh-beam, a load platform on said weigh-beam, a weight platform supported by said weigh-beam, a cage above said weigh-beam having openings on opposite vertical sides thereof, the edges of said openings being shaped to provide substantially horizontally extending supporting surfaces, weights, lugs on said weights, each adapted to engage different ones of said horizontally extending supporting surfaces, and means for moving said cage vertically to deposit and remove weights from said weight platform, said weights being deposited on said weight platform by the downward movement of said cage and released from engagement with said cage by further downward movement thereof.

17. In a weighing apparatus, the combination with a weigh-beam, of a load counterbalancing means, and a floating connection between said weigh-beam and said load counterbalancing means comprising a guide rod, flexible connections between said guide rod and said load counterbalancing means, a supporting surface on said weigh-beam engaging a portion of said guide rod while permitting transverse movement of said guide rod relative to said supporting surface, and anti-friction means carried by said actuating rod and operating in a guide carried by the end of said weigh-beam for guiding said actuating rod in a vertical path.

18. A device as claimed in claim 17 in which a weight platform is provided on said actuating rod for receiving supplemental weights to increase the load capacity of said weighing apparatus, said weights being deposited selectively upon said weight platform by a single means.

19. In a weighing apparatus, the combination with a load counterbalancing means comprising flexible elements operatively connected to floating angularly movable weights, additional flexible means connected to said weights to form an additional support therefor, a rod connected to said flexible means, a weigh-beam, an operative connection between the end of said weigh-beam and said actuating rod for moving said actuating rod in a rectilinear path without lateral movement thereof, a weight platform on said actuating rod, spaced plates having openings therein with horizontal bearing surfaces thereon, weights carried by said bearing surfaces and embracing said rod, anti-friction means for guiding said plates vertically, an operative connection for manually moving said plates vertically to deposit on or remove from said weight platform the desired number of weights.

In testimony whereof I have signed my name to this specification on this eleventh day of April, A. D. 1930.

JOHAN HENDRIK de IONGH.